3,109,024
METHOD OF PREPARING THYROXINE AND ITS
ANALOGS
Robert I. Meltzer, Rockaway, and Robert J. Stanaback,
Bernardsville, N.J., assignors to Warner-Lambert
Pharmaceutical Company, Morris Plains, N.Y., a corporation of Delaware
No Drawing. Filed June 20, 1960, Ser. No. 37,095
7 Claims. (Cl. 260—519)

The present invention relates to a new and novel method of preparing thyroxine, and thyroxine analogs of the formula:

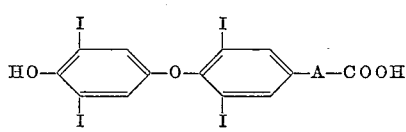

where A is a direct linkage, a saturated alkylene radical having 1 to 4 carbon atoms or a monosubstituted saturated alkylene radical having 1 to 4 carbon atoms, the substituent being a hydroxyl, an acylamino or amino group. In accordance with the above, of course, A equally may be defined as the group —$(CH_2)_n$— wherein $n$ is 0 to 4.

Thyroxine, the hormone of the thyroid gland, (which has the above formula where A is

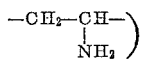

is in widespread clinical use in treating various human ailments resulting from thyroid deficiencies. In addition, there has been considerable interest in recent years in analogs of thyroxine which, in the clinic, have been found to exhibit varying forms of thyroxine-like activity. In view of this widespread interest and the importance of thyroxine and its analogs, there has been a need for an efficient and reliable method of synthesizing these compounds.

The methods heretofore available have been characterized either by great complexity in requiring a large number of individual reaction steps or by extremely low yields or by requiring exceedingly long reaction times all of which are quite disadvantageous. Typical of a multi-step synthesis of thyroxine is that disclosed by Borrows et al., J. Chem. Soc. (London), S185 to S190 (1949). U.S. Patent No. 2,803,654 describes a more simple synthetic method, but it, too, suffers disadvantages in that reaction times of one and six days are required. It is apparent that reaction sequences involving a large number of reaction steps or requiring prolonged reaction times, while satisfactory on a laboratory scale, do not offer great promise as an economically feasible commercial synthetic route.

It is an important object of the present invention to provide a method of synthesizing thyroxine and its analogs characterized by simplicity of operation, short reaction time and good yields.

Other objects and the advantages of this invention will become apparent from the following detailed description.

It has now been found that thyroxine analogs of the formula:

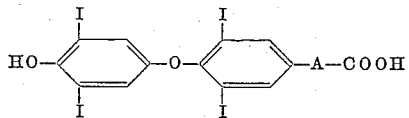

where A is as described above, may be prepared by reacting a substituted di-o-iodophenol of the formula:

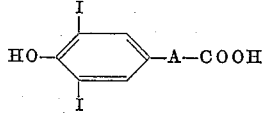

wherein A has the meaning above, with 4-hydroxy-3,5-diiodophenylpyruvic acid in the presence of an oxidizing agent in a reaction medium having a pH of between about 6 to about 11.

Among the thyroxine analogs which may be prepared by the method of this invention, in addition to thyroxine itself, are:

3,5-diiodo-4-(4-hydroxy-3,5-diiodophenoxy)benzoic acid,
3,5-diiodo-4-(4-hydroxy-3,5 - diiodophenoxy)phenylacetic acid,
3,5-diiodo-4-(4 - hydroxy - 3,5 - diiodophenoxy)phenylpropionic acid,
3,5-diiodo-4-(4-hydroxy - 3,5 - diiodophenoxy)phenylbutyric acid,
3,5-diiodo-4-(4-hydroxy - 3,5 - diiodophenoxy)phenylvaleric acid,
3,5-diiodo-4-(4 - hydroxy - 3,5 - diiodophenoxy)phenylglycine,
3,5-diiodo-4-(4-hydroxy - 3,5 - diiodophenoxy)phenyl($\alpha$-aminobutyric)acid,
3,5-diiodo-4-(4-hydroxy - 3,5 - diiodophenoxy)phenyl($\beta$-aminobutyric)acid,
3,5-diiodo-4-(4-hydroxy - 3,5 - diiodophenoxy)mandelic acid,
3,5-diiodo-4-(4-hydroxy - 3,5 - diiodophenoxy)phenyl($\alpha$-hydroxypropionic) acid,
3,5-diiodo-4-(4-hydroxy - 3,5 - diiodophenoxy)phenyl($\alpha$-hydroxybutyric)acid,
3,5-diiodo-4-(4-hydroxy - 3,5 - diiodophenoxy)phenyl($\beta$-hydroxybutyric)acid,
N-acetylthyroxine and the like.

The substituted di-o-iodophenol starting materials of the formula:

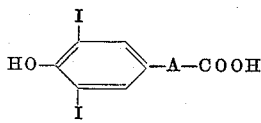

are well-known chemicals and may be prepared by methods well-known in the prior art. For example, in the synthesis of thyroxine by the method of this invention the starting material of the above formula is 3,5-diiodotyrosine, a well-known amino acid. The other starting material, namely 4-hydroxy-3,5-diiodophenylpyruvic acid is also a known compound and may be prepared, for example, by the procedure described by Tong et al. J. Biol. Chem. 207, 75 (1954).

In accordance with the method of the present invention the two reactants as described above are mixed in an aqueous reaction medium maintained at a pH between about 6 and about 11, with pH range of 7.4 to 8.0 being generally preferred. The relative molar proportions of the reactants may be varied over wide limits, although for optimum yields based on both reactants, equimolar proportions should be used. It has been found that the yield based on the substituted di-o-iodophenol reactant becomes maximum with about a 20 percent molar excess of the 4-hydroxy-3,5-diiodophenylpyruvic acid.

In carrying out the reaction, the substituted di-o-iodophenol starting material is dissolved in water at a pH within the above-described range and then the substituted pyruvic acid starting material is added to the aqueous solution to initiate the reaction. It has been found that higher yields are obtained when the substituted pyruvic acid starting material is added portion-wise to the aqueous solution. For optimum results in terms of yield, a two phase reaction mixture is employed, the aqueous solution of the substituted di-o-phenol constituting one phase and a water immiscible, inert organic solvent constituting the second phase. The substituted pyruvic acid starting material dissolves in this second phase. The phases are maintained in intimate contact during the reaction by vigorous agitation. Useful solvents for the second phase include n-butanol, chloroform, carbon tetrachloride, benzene, toluene, nitrobenzene and the like. The solvent to form the second phase may be added to the aqueous solution before the substituted pyruvic acid is added or this starting material may be added in the form of a solution in the water immiscible solvent.

The temperature of the reaction mixture may be varied over wide limits without affecting the yield with temperatures between 0° C. and 50° C. being equally effective.

It is essential that the reaction be carried out in the presence of an oxidizing agent, for example oxygen, iodic acid, hydrogen peroxide, t-butyl peroxide and the like. The use of a gaseous oxidizing agent such as oxygen is preferred since it can easily be supplied to the reaction mixture continuously during the course of the reaction. The available oxygen in the oxidizing agent should be equivalent to the amount of the substituted pyruvic acid starting material supplied to the reaction. It has been found that the use of oxygen combined with catalytic amounts of t-butyl peroxide results in the highest yields in the reaction of this invention.

It is desirable that the aqueous phase of the reaction mixture contain dissolved metallic salts, particularly the sulfate or chloride salts of sodium, potassium, manganese, nickel and magnesium. The use of about 3 to about 6 percent by weight of salt in the aqueous phase is desirable, with a range of 4.5 to 5 percent by weight being preferred. It has been found that sodium sulfate and magnesium sulfate are particularly useful salts in carrying out the reaction sequence of this invention.

At the conclusion of the reaction which normally requires about ½ to about 3 hours, the finished product is recovered from the reaction mixture. Where a single phase reaction medium has been used the finished product separates as a precipitate which may be recovered by filtration and then purified by crystallization. Where the preferred two-phase reaction medium has been used the immiscible organic solvent is removed by evaporation and the precipitated finished product recovered from the aqueous phase as described above.

The reaction sequence of the present invention results in yields of between 20 percent and 30 percent of theory with reaction times varying between ½ and 3 hours. The method is therefore a marked improvement over previous methods of synthesizing thyroxine and its analogs, since economically feasible yields are obtained in a relatively simple reaction. Although Hillmann in Z. Naturforschung 11b. 424 (1956) has postulated and carried out the reaction of 3,5-diiodotyrosine with 4-hydroxy-3,5-diiodophenylpyruvic acid the reported yield is only 3 percent with a reaction time of five days. Accordingly, the new and novel method of this invention represents a marked improvement over the method reported in the Hillmann paper.

The following examples are included in order further to illustrate the method of the present invention:

EXAMPLE 1

Thyroxine

The pH of a mixture of 2.17 g. (4.64 mM.) of 3,5-diiodotyrosine, 50 ml. of 0.2 M. borate buffer solution (pH 7.6), 17.5 ml. of a saturated solution of sodium sulfate and 17.5 ml. of 1 N NaOH is adjusted to 7.6 by the addition of 4 N hydrochloric acid and 25 ml. of chloroform are then added. Oxygen is vigorously bubbled through the mixture, while 1.8 g. (4.16 mM.) of 4-hydroxy-3,5-diiodophenylpyruvic acid is added in small portions at 5 minute intervals. During the addition, vigorous stirring is maintained and the pH of the solution is kept between 7.4 and 7.8 by the addition of 2 N NaOH. Addition of the substituted pyruvic acid requires 1¾ hours. A slight temperature rise results from the heat generated by the magnetic stirrer.

After completion of the addition, the mixture is stirred for an additional 10–15 minutes. The chloroform is removed under water pump vacuum. The residue is filtered to give 750 mg. (23% yield) of crude product. On paper partition chromatography, this material shows itself to consist almost solely of thyroxine.

EXAMPLE 2

L-Thyroxine

A mixture of 2.17 g. (4.64 mM.) of L-3,5-diiodotyrosine, 50 ml. of 0.2M borate buffer (pH 7.6), 17.5 ml. 1 N NaOH and 17.5 ml. of sodium sulfate (saturated solution) is adjusted with 4 N hydrochloric acid to pH 7.6 at 25° C. After addition of 20 ml. of n-butanol, 0.1 g. of t-butyl hydroperoxide (available active $O_2$ 10%) is added and oxygen gas bubbled through the rapidly stirred mixture, accompanied by the dropwise addition of a solution of 1 g. (2.32 mM.) of the 4 - hydroxy - 3,5 - diiodophenylpyruvic acid in 15 ml. of n-butanol. Addition requires 30 minutes and the pH of the reaction mixture is kept between 7.4 and 7.8 by addition of 2 N NaOH.

The reaction mixture is stirred an additional 10 minutes after completion of the addition of the substituted pyruvic acid. The n-butanol layer is removed under water pump vacuum and the suspended precipitate is filtered from the aqueous layer and washed with water. The precipitate is triturated with 4 N hydrochloric acid, filtered, washed with water and dried to give a crude yield of L-thyroxine of 29%.

EXAMPLE 3

3,5-Diiodo-4-(4-Hydroxy-3,5-Diiodophenoxy)Phenylacetic Acid

A mixture of 1.87 grams (4.64 mM.) of 3,5-diiodo-4-hydroxyphenylacetic acid, 50 ml. of 0.2M borate buffer (pH=7.6), 17.5 ml. of saturated aqueous sodium sulfate and 17.5 ml. 1 N NaOH is mixed at room temperature with 25 ml. of chloroform and the pH is adjusted to 7.6 by the addition of 4 N HCl. Ozygen is bubbled through the mixture with vigorous stirring while 1 gram (2.32 mM.) of 3,5-diiodo-4-hydroxyphenylpyruvic acid is added in 80 mg. portions at 5 minute intervals. The pH of the reaction mixture is maintained at 7.4–7.8 by the addition of 2 N NaOH. After the last addition, the mixture is stirred for 10 minutes.

The chloroform is removed under vacuum and the solid collected by filtration. Trituration with 4 N HCl, filtration and washing with water yields 130 mg. of 3,5-diiodo-4-(4-hydroxy-3,5 - diiodophenoxy)phenylacetic acid. Circular paper partition chromatography (solvent system 6 N ammonia: t-amyl alcohol, 1:1) shows an $R_f$ of 0.712, compared to $R_f$=0.708 for an authentic sample. A mixed melting point of the product, after recrystallization from aqueous methanol, with the authentic sample shows no depression.

EXAMPLE 4

3,5-Diiodo-4-(4-Hydroxy-3,5-Diiodophenoxy)Benzoic Acid

The reaction and recovery procedure described in Example 3 is repeated, using as a starting material 3,5-diiodo-4-hydroxybenzoic acid in place of the 3,5-diiodo-4-hydroxyphenylacetic acid of Example 3. The product, 3,5-diiodo-4-(4 - hydroxy - 3,5 - diiodophenoxy)benzoic acid shows an $R_f$ value of 0.695 compared to the $R_f$ of an authentic sample of 0.690.

EXAMPLE 5

*3,5-Diiodo-4-(4-Hydroxy-3,5-Diiodophenoxy)Phenylpropionic Acid*

The reaction and recovery procedure described in Example 3 is repeated, using as a starting material 3,5-diiodo-4-hydroxyphenylpropionic acid in place of the 3,5-diiodo-4-(4-hydroxy-3,5-diiodophenoxy)phenylacetic acid of Example 3. On paper partition chromatography, the $R_f$ of the product 3,5-diiodo-4-(4-hydroxy-3,5-diiodophenoxy) phenylpropionic acid is the same as that of an authentic sample.

EXAMPLE 6

*3,5-Diiodo-4-(4-Hydroxy-3,5-Diiodophenoxy)Mandelic Acid*

The reaction and recovery procedure of Example 3 is repeated, using as a starting material 3,5-diiodo-4-hydroxy-mandelic acid in place of the 3,5-diiodo-4-hydroxyphenylacetic acid used in Example 3. The product is 3,5-diiodo-4-(4-hydroxy-3,5-diiodophenoxy)mandelic acid.

Paper partition chromatography shows a single spot with only a trace of impurities.

EXAMPLE 7

*N-Acetylthyroxine*

The reaction and recovery procedure of Example 3 is repeated, using as a starting material N-acetyl-3,5-diiodotyrosine in place of the 3,5-diiodo-4-hydroxyphenylacetic acid used in Example 3. Paper partition chromatography shows the product N-acetylthyroxine to be identical to an authentic sample. In a similar manner, other N-acylated derivatives of thyroxine may be prepared, for example N-formylthyroxine, N-benzoylthyroxine and the like.

In Examples 4, 5, 6 and 7 the same molar proportions of the reactants are used as in Example 3.

It is understood that the foregoing detailed description is given merely by way of illustration and that many variations may be made therein without departing from the spirit of our invention.

Having described our invention, what we desire to secure by Letters Patent is:

We claim:
1. A method of preparing a compound of the formula:

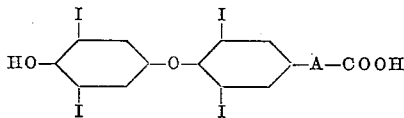

wherein A is a member of the group consisting of —$(CH_2)_n$—, wherein $n$ is 0 to 4, and saturated alkylene radicals having 1 to 4 carbon atoms mono-substituted with a member of the group consisting of hydroxyl, monocarboxylic acylamino and amino, which consists in the portionwise addition over a period of about one-half to about three hours of 4-hydroxy-3,5-diiodophenylpyruvic acid to a mixture of an inert water immiscible organic solvent with an aqueous solution of a substituted diiodophenol of the formula:

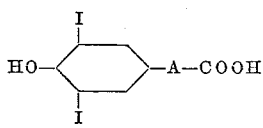

wherein A is as defined above, containing about 3 to about 6 percent by weight of the solution of a salt of a metal selected from the group consisting of sodium, potassium, manganese, magnesium and nickel, and an oxidizing agent selected from the group consisting of iodic acid, hydrogen peroxide, t-butyl peroxide and oxygen, maintaining the pH of said solution at between about 6 and about 11 and the temperature between about 0° C. and about 50° C.

2. A method of preparing thyroxine which comprises the portionwise addition over a period of about one-half to about three hours of 4-hydroxy-3,5-diiodophenylpyruvic acid to a mixture of an inert water immiscible organic solvent and an aqueous solution comprising 3,5-diiodotyrosine and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

3. A method of preparing 3,5-diiodo-4-(4-hydroxy-3,5-diiodophenoxy)phenylacetic acid which comprises the portionwise addition over a period of about one-half to about three hours of 4-hydroxy-3,5-diiodophenylpyruvic acid to a mixture of an inert water immiscible organic solvent and an aqueous solution comprising 3,5-diiodo-4-hydroxyphenylacetic acid and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

4. A method of preparing 3,5-diiodo-4-(4-hydroxy-3,5-diiodophenoxy)benzoic acid which comprises the portionwise addition over a period of about one-half to about three hours of 4-hydroxy-3,5-diiodophenylpyruvic acid to a mixture of an inert water immiscible organic solvent and an aqueous solution comprising 3,5-diiodo-4-hydroxybenzoic acid and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

5. A method of preparing 3,5-diiodo-4-(4-hydroxy-3,5-diiodophenoxy)phenylpropionic acid which comprises the portionwise addition over a period of about one-half to about three hours of 4-hydroxy-3,5-diiodophenylpyruvic acid to a mixture of an inert water immiscible organic solvent and an aqueous solution comprising 3,5-diiodo-4-hydroxyphenylpropionic acid and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

6. A method of preparing 3,5-diiodo-4-(4-hydroxy-3,5-diiodophenoxy)mandelic acid which comprises the portionwise addition over a period of about one-half to about three hours of 4-hydroxy-3,5-diiodophenylpyruvic acid to a mixture of an inert water immiscible organic solvent and an aqueous solution comprising 3,5-diiodo-4-hydroxymandelic acid and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

7. A method of preparing N-acetylthyroxine which comprises the portionwise addition over a period of about one-half to about three hours of 4-hydroxy-3,5-diiodophenylpyruvic acid to a mixture of an inert water immiscible organic solvent and an aqueous solution comprising N-acetyl-3,5-diiodotyrosine and about 3 to about 6 percent by weight of the solution of a salt of a metal selected from the group consisting of sodium, potassium, manganese, magnesium and nickel while bubbling oxygen through said mixture and maintaining the pH of said solution between about 6 and about 11 and the temperature of said mixture between about 0° C. and about 50° C.

References Cited in the file of this patent

UNITED STATES PATENTS 2,803,654　　Anthony et al. _____ Aug. 20, 1957

OTHER REFERENCES

Hillmann: Zeitschrift fur Naturforschung, Bd. 11B, page 424 (1956).